(12) United States Patent
Erickson

(10) Patent No.: US 6,682,086 B1
(45) Date of Patent: Jan. 27, 2004

(54) STEP PLATFORM AND BALL HITCH ASSEMBLY

(76) Inventor: Wade Erickson, 1944 W. Church Rd., Star Prairie, WI (US) 54026

( * ) Notice: Subject to any disclaimer, the term of this patent is extended or adjusted under 35 U.S.C. 154(b) by 37 days.

(21) Appl. No.: 10/035,057

(22) Filed: Jan. 3, 2002

(51) Int. Cl.$^7$ .................................................. B60R 3/00
(52) U.S. Cl. ...................................... 280/166; 280/163
(58) Field of Search ................................. 280/163, 166, 280/169, 727, 511, 164.1, 504, 515; D12/203, 101, 162; 296/62; 293/117; 224/519, 520, 521; 105/443, 449

(56) References Cited

U.S. PATENT DOCUMENTS

| 3,580,613 | A | * | 5/1971 | Northrop ..................... 280/511 |
| 3,762,742 | A | * | 10/1973 | Bucklen ...................... 280/166 |
| 3,826,517 | A | * | 7/1974 | Hunter ........................ 280/511 |
| 5,702,118 | A | * | 12/1997 | Hanson et al. ........... 280/491.5 |
| 5,727,805 | A | * | 3/1998 | La Roque ................ 280/478.1 |
| 5,738,362 | A | | 4/1998 | Ludwick |
| 5,803,475 | A | | 9/1998 | Dick |
| 5,829,774 | A | | 11/1998 | Klemp |
| 5,897,125 | A | * | 4/1999 | Bundy ......................... 280/166 |
| 5,915,714 | A | * | 6/1999 | Bell et al. ................. 280/456.1 |
| 6,145,861 | A | | 11/2000 | Willis |
| 6,145,865 | A | | 11/2000 | Cannara et al. |
| 6,170,843 | B1 | | 1/2001 | Maxwell et al. |
| 6,237,927 | B1 | | 5/2001 | Debo |
| 6,530,588 | B1 | * | 3/2003 | Varney et al. .............. 280/166 |
| 6,554,311 | B1 | * | 4/2003 | Blankenship et al. ....... 280/507 |
| 2002/0125677 | A1 | * | 9/2002 | Knodle et al. .............. 280/166 |
| 2003/0011164 | A1 | * | 1/2003 | Cipolla ..................... 280/164.1 |

* cited by examiner

Primary Examiner—Brian L. Johnson
Assistant Examiner—G B Klebe
(74) Attorney, Agent, or Firm—Tipton L. Randall

(57) ABSTRACT

A step platform assembly for attachment to a vehicle hitch assembly is disclosed. The platform assembly includes a planar step platform member rigidly fastened to a coplanar linear step support member having an aperture adjacent a step support member end opposite the step platform member. The aperture contains a bushing member with the planar step platform member and step support member assembly adapted for rotatable connection to the hitch assembly by a fastener there between. A locking system is present for selectively securing the step platform member and linear step support member either beneath a vehicle body or exterior a vehicle body.

12 Claims, 6 Drawing Sheets

STEP PLATFORM AND BALL HITCH ASSEMBLY

CROSS REFERENCE TO RELATED APPLICATION

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

1. Field of the Invention

The invention relates to a step and ball hitch assembly for a vehicle and, more particularly, to an assembly that fastens to a receiver hitch with the step portion rotatable to a location beneath the vehicle body.

2. Background of the Invention

With the increased use of relatively large vehicles, such as utility vehicles, vans, pickup trucks with or without a cover shell, and other high vehicles, there exists a need for an inexpensive and easy to use means, such as a step to aid persons in entering, leaving and loading the rear of such vehicles. A number of steps of various types for the front, rear or side of various vehicles have been provided so that a person can safely enter and exit the vehicle, these steps have not been successful in providing an easily removable step that may be attached to an existing trailer hitch at the rear of a vehicle, and which step may be rotated between a "storage" and an "in use" position. Thus, there exists a long felt need in the art for an easy to manufacture, mount and use step for a vehicle, that may be safely inserted and removed for use on different vehicles, and particularly, on the rear of a vehicle having an existing trailer hitch, for easy insertion into and out of such an existing trailer hitch. The step of the present invention is capable of easy motion to and from a storage, locked position when the vehicle is in motion or the step is not in use, to an in use, extended position when it is desired to use the step.

While foldup and sliding steps are known for trucks and other vehicles, such steps are limited for attachment to bumpers or for permanent attachment to a vehicle, and such known step means do not meet the need of all users. Thus, there still exists a need for a rotatale step means for a vehicle having a trailer hitch, the step safely usable on any vehicle having a receiver-type trailer hitch, with the device easily removed and/or stored when not in use. Some examples of step devices for which patents have been granted include the following.

Ludwick, in U.S. Pat. No. 5,738,362, describes a step that is mounted to a rectangular receiver by a bar or hollow beam held in the receiver with a bolt or pin. The flat step is rotatably fastened to the beam by a post that fits in a circular opening in the beam. A locking means, such as a U-shaped bracket fastened to the end of the post, allows the step to be positioned beneath the receiver or, by lifting and rotating the post, to be positioned beyond the receiver, thus forming a step.

In U.S. Pat. No. 5,803,475, Dick discloses a receiver hitch step attachment for mounting to a vehicle receiver hitch. The steps are adjustable laterally and vertically. An auxiliary stabilizer leg is provided for engaging the ground when the truck is parked in order to support the vehicle against movement when an individual uses the steps or moves inside the truck bed. The steps remain exposed when in a stored position.

Klemp, in U.S. Pat. No. 5,892,774, describes a removable bumper that may be releasably coupled to a hitch located in the rear of a vehicle for concealing the hitch from view and for providing a step support for entry into the vehicle. The bumper/step device has a shaft that fits into a receiver, with flattened areas on the horizontal bumper acting as steps. The bumper/step remains exposed at all times.

U.S. Pat. No. 6,145,861 by Willis discloses a trailer hitch step that mounts to the ball and support of a hitch. The ball must be in position for the step to be attached and used.

In U.S. Pat. No. 6,145,865, Cannara et al. describe a combined trailer hitch cover and step assembly that includes a flat, rectangular step that rotatably attaches to a receiver with a pin and bracket fastener. The step can be positioned horizontally when needed as a step and vertically when not in use. The step remains exposed at all times.

Maxwell et al., in U.S. Pat. No. 6,170,843, describe a trailer hitch step which mounts to a receiver-type trailer hitch with the step portion extending to the side of the tailgate of the vehicle. The support bar for the step may be rigid, telescoping, or folding for storage.

U.S. Pat. No. 6,237,927 by Debo discloses a similar trailer hitch step which includes a bracket that attaches to a frame hitch. The device includes a beam with a tread at one end, the beam slidable within the bracket so the beam and tread can be stored beneath the vehicle chassis when not in use. The beam may include a gooseneck to lower the tread to about half the height of the tailgate, as illustrated in the figures.

SUMMARY OF THE INVENTION

The invention is a step platform assembly for attachment to a vehicle hitch assembly. The platform assembly includes a planar step platform member rigidly fastened to a coplanar linear step support member having an aperture adjacent a step support member end opposite the step platform member. The aperture contains a bushing member with the planar step platform member and step support member assembly adapted for rotatable connection to the hitch assembly by a fastener means there between. A locking means is present for selectively securing the step platform member and linear step support member either beneath a vehicle body or exterior a vehicle body.

The invention also includes a step platform and hitch assembly, including a square tubular support member adapted for insertion into a receiver hitch bracket on a vehicle. A hitch connector member is rigidly secured to one end of the tubular support member at an angle thereto, with the hitch connector member having an end section opposite the tubular support member. The hitch connector member end section is oriented parallel to the tubular support member, with the end section having an aperture therein. A planar step platform member is rigidly fastened to a linear step support member having an aperture adjacent the step support member end opposite the platform member. A fastener means is insertable into the hitch connector member end section aperture and the step support member aperture, thereby rotatably connecting the step platform member and step support member to the hitch connector member and tubular support member. A locking means is present for selectively securing the step platform and step support member either beneath a vehicle body or exterior a vehicle body. In a preferred embodiment, the fastener means includes a ball hitch with threaded base and a hex nut. The assembly functions both as a trailer hitch and a rotatable step when attached to a vehicle.

DESCRIPTION OF THE PREFERRED EMBODIMENTS

Figure 1:
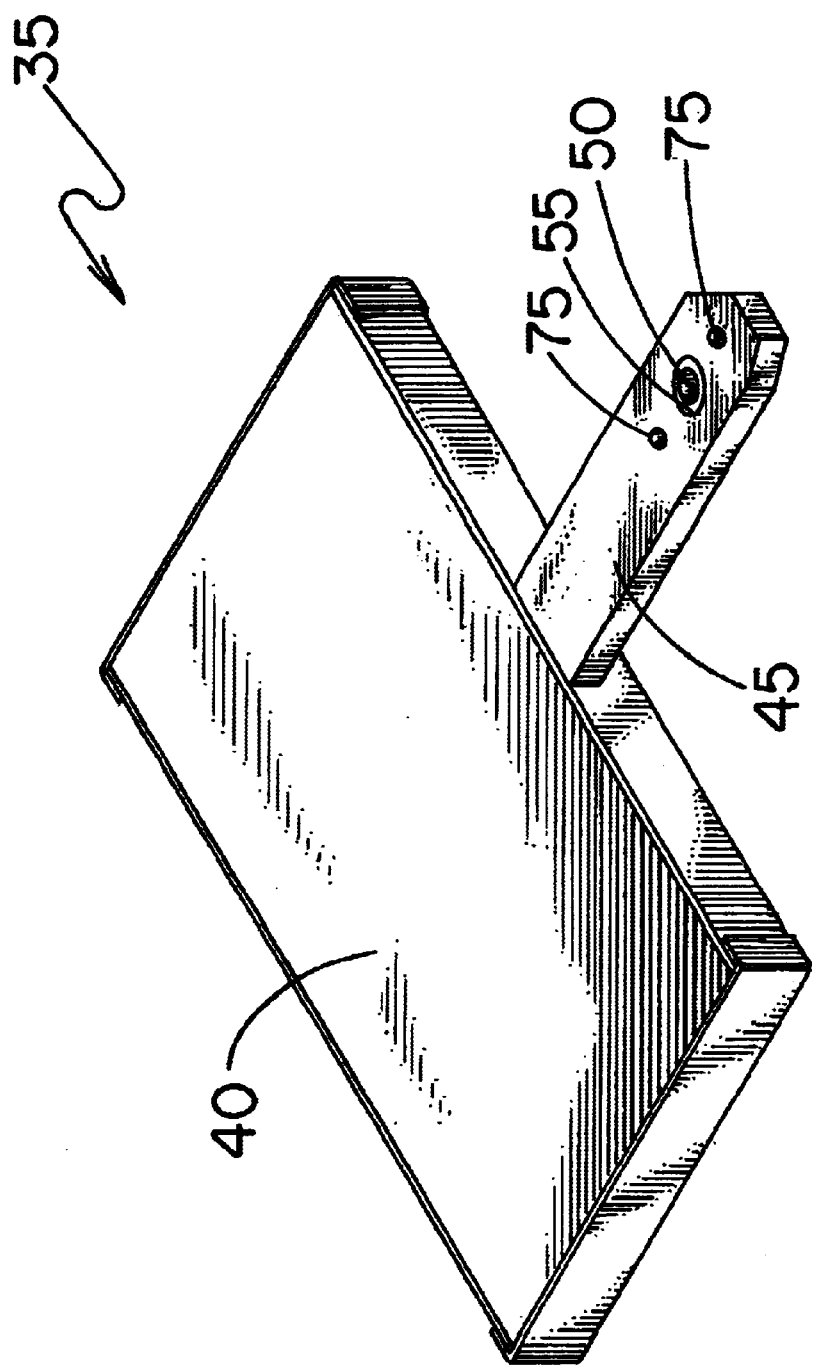
FIG. 1 is a perspective view of one embodiment of the step platform assembly of the present invention.

Nomenclature
10 Step Platform and Hitch Assembly
12 Hitch Assembly
14 Square Tubular Bracket Member
15 Square Tubular Support Member
20 Hitch Connector Member
25 Horizontal Section of Hitch Connector Member
30 Aperture in Hitch Connector Member
35 Step Platform Assembly
40 Step Platform Member
45 Linear Step Support Member
50 Aperture in Step Support Member
55 Bushing Member
60 Ball Hitch and Nut Assembly
65 Threaded Bolt and Nut Assembly
70 Locking Aperture in Hitch Connector Member
75 Locking Apertures in Step Platform Assembly
80 Locking Pin Member
85 First Flange Member
90 Apertures in First Flange Member
95 Second Flange Member
100 Aperture in Second Flange Member
Construction The present invention is most useful when installed on a pickup truck or similar vehicle having a tailgate that pivots from a vertical, closed position to a horizontal, open position. Such trucks or similar vehicles are routinely equipped with a trailer hitch assembly 12 secured to the frame or rear bumper of the vehicle and centered at the rear of the cargo box. The trailer hitch assembly 12 may be removable or permanently secured to the vehicle. The most common type of removable hitch is the so called receiver hitch. A square tubular bracket member 14 is permanently fastened to the rear of the vehicle and a square tubular support member 15 is insertable within the bracket 14. Both the bracket 14 and tubular support member 15 have alignable holes so that a pin can be inserted through both parts and secured with a clip to hold the two parts together. The square tubular support member 15 has a linear hitch connector member 20 fastened at the end opposite the bracket 14. The hitch connector member 20 is frequently angled toward the ground and then curves to become parallel with the square tubular support member 15. This horizontal hitch connector section 25 contains an aperture 30 that holds a trailer ball hitch assembly 60, having a threaded stem and accompanying threaded nut, perpendicular to the horizontal hitch connector section 25. The above described receiver hitch assembly 12 is widely used for towing various trailers, mobile homes, etc. by the powered vehicle.

One embodiment of the present invention is illustrated in FIG. 1, where a step platform assembly 35 for attachment to a hitch assembly 12 is shown. The step platform assembly 35 includes a planar step platform member 40 rigidly fastened to a coplanar linear step support member 45, having an aperture 50 adjacent a step support member end opposite the step platform member 40. The step platform member 40 is shown as rectangular in shape, however the step platform member 40 may be square, round, oval, or any shape desired without affecting the utility of the assembly. The aperture 50 in the step support member 45 preferably contains a bushing member 55 therein. The planar step platform member and step support member assembly 35 is adapted for rotatable connection to a drop down hitch assembly 12 by a fastener means there between. The fastener means preferably is a ball hitch assembly 60, with a threaded stem and threaded nut. The threaded stem of the ball hitch assembly 60 is sufficiently long that it passes through both the aperture 30 in the horizontal section 25 of the hitch assembly 12 and the bushing member 55 in the aperture 50 of the step platform assembly 35, with the nut secured on the stem opposite the ball. The bushing member 55 allows the step platform assembly 35 to rotate relative to the stationary hitch assembly 12. Alternatively, the fastener means can include a simple bolt and threaded nut assembly 65 if the ball hitch assembly 60 is not required.

Figure 2:
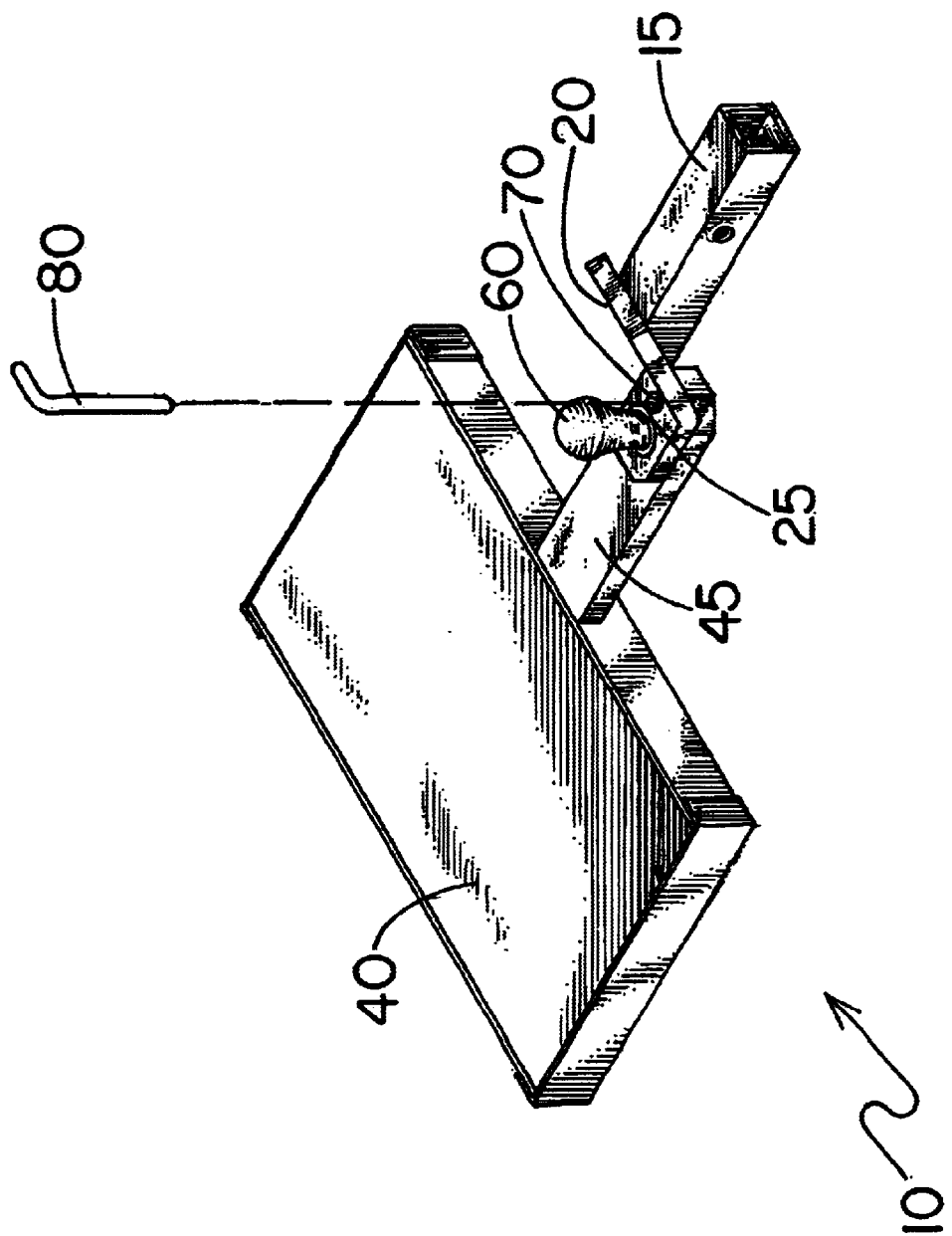
FIG. 2 is a perspective view of one embodiment of the step platform and hitch assembly of the present invention in the "in use" configuration.
Figure 3:
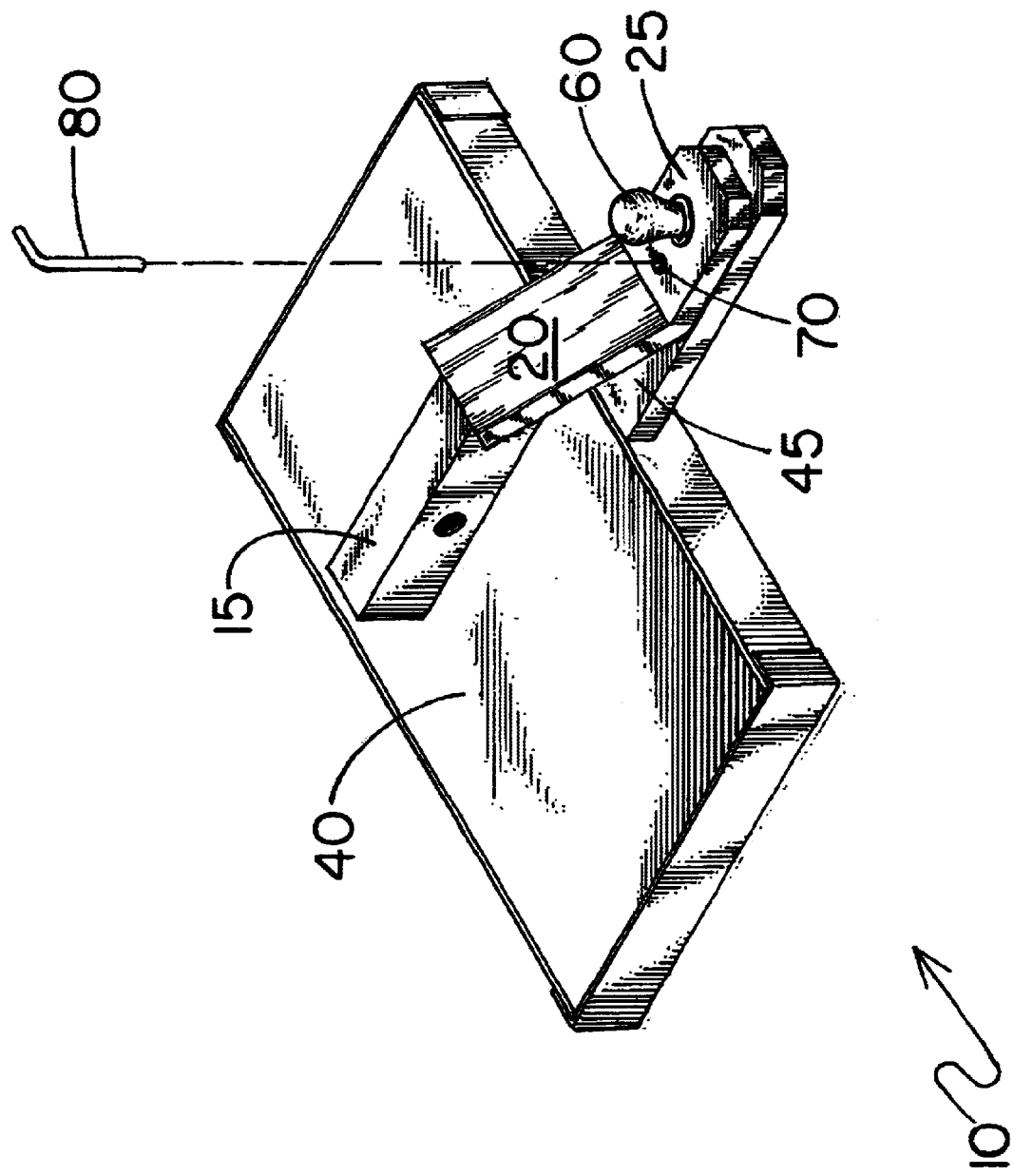
FIG. 3 is a perspective view of one embodiment of the step platform and hitch assembly of the present invention in the storage configuration.
Figure 6:
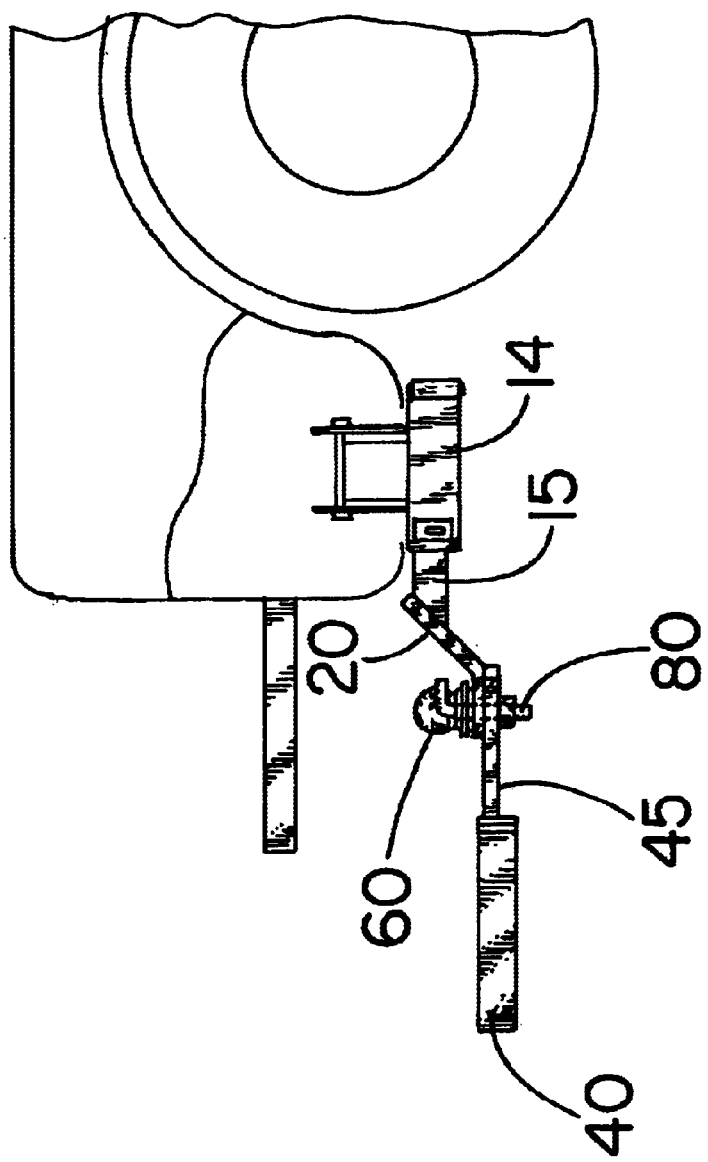
FIG. 6 is a plan view of one embodiment of the step platform and hitch assembly of the present invention secured to a vehicle in the "in use" configuration.

In order to selectively and securely position the step platform assembly 35, a locking means is provided for selectively securing the step platform assembly 35 either beneath the vehicle body or exterior the vehicle body. In one embodiment of the invention illustrated in FIGS. 1–3, the locking means comprises alignable apertures in both the hitch assembly 12 and the step platform assembly 35. The horizontal section 25 of the hitch assembly 12 contains a second aperture 70 positioned between the first aperture 30 and the square tubular support member 15. The linear step support member 45 contains a pair of apertures 75, one on each side of the first aperture 50 forming a line perpendicular to the step platform member 40, as seen in FIG. 1. With the step platform member 40 positioned beneath the vehicle body, the second aperture 70 and one aperture 75 of the linear step support member 45 are aligned and a locking pin member 80 is inserted to hold the step platform assembly 35 in the storage position beneath the vehicle body, as illustrated in FIG. 3. With the step platform assembly 35 rotated to extend exterior the vehicle body, the second aperture 70 and the other aperture 75 of the linear step support member 45 are aligned and the locking pin member 80 is inserted to hold the step platform assembly 35 exterior the vehicle body, in the "in use" position, as illustrated in FIG. 2. The linear step support member 45 is of sufficient length that the step platform member 40 extends beyond a horizontally positioned tailgate of a vehicle, thereby providing a step to assist in entering the cargo box of the vehicle, as illustrated in FIG. 6.

Figure 4:
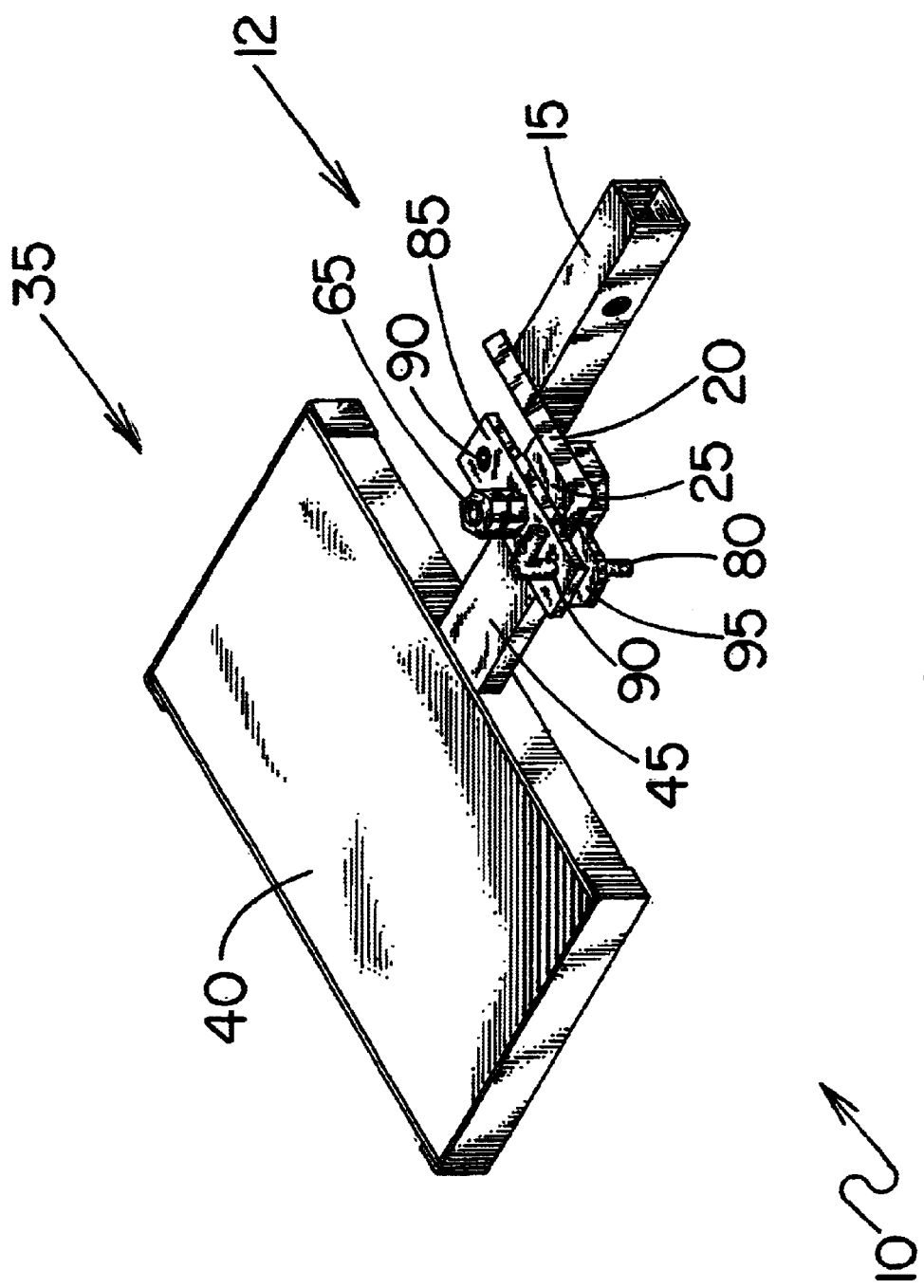
FIG. 4 is a perspective view of another embodiment of the step platform and hitch assembly of the present invention in the "in use" configuration.
Figure 5:
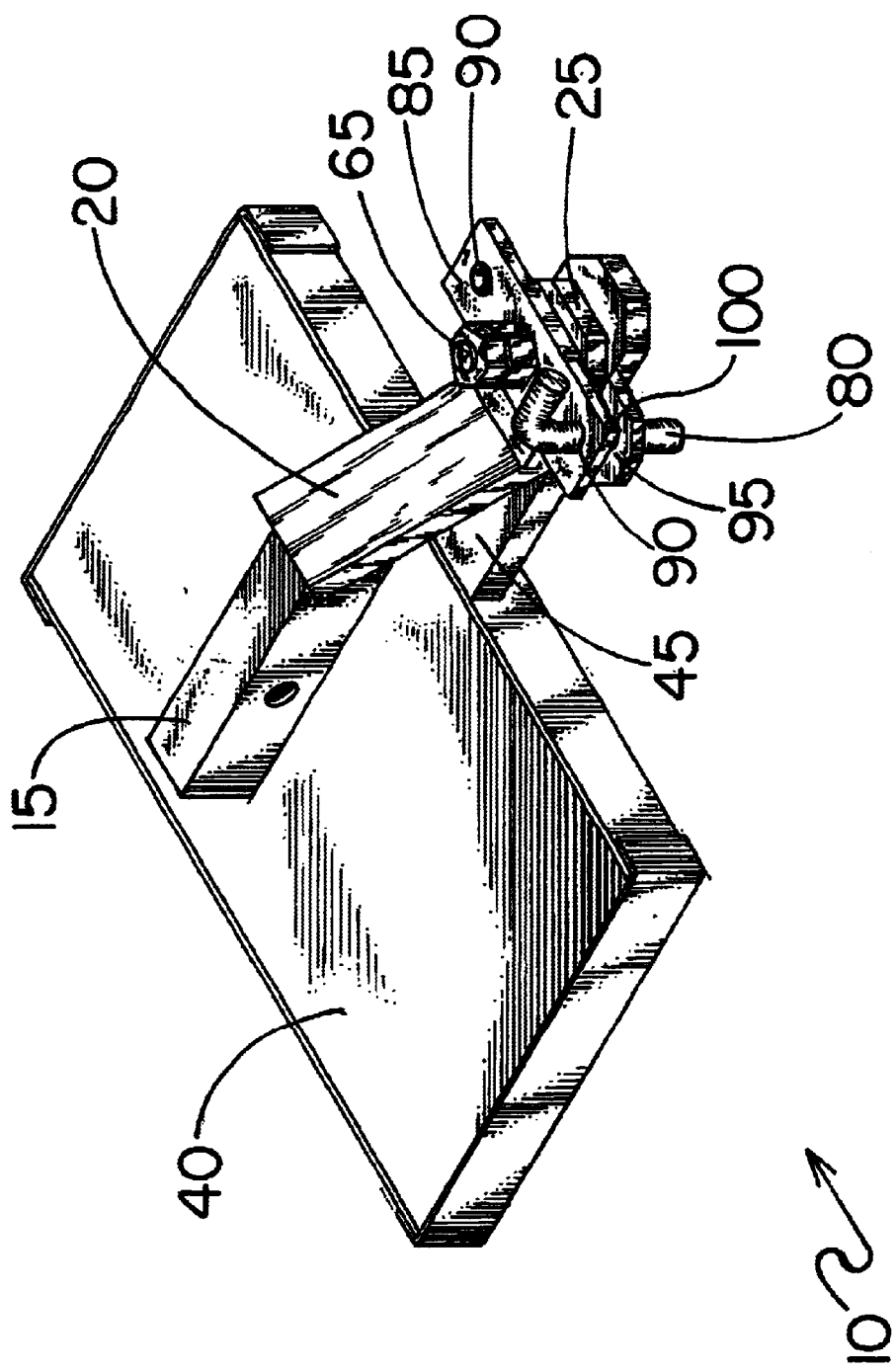
FIG. 5 is a perspective view of another embodiment of the step platform and hitch assembly of the present invention in the storage configuration.

In another embodiment of the invention illustrated in FIGS. 4 and 5, the locking means comprises first and second flange members, with the first flange member 85 secured to the hitch assembly 12 and having two apertures 90 therein, and the second flange member 95 secured to the step assembly linear step support member 45 and having an aperture 100 therein. A locking pin member 80, inserted through one aperture 90 of the first flange member 85 and the aligned aperture 100 of the second flange member 95, positions the step platform assembly 35 beneath a vehicle body, as illustrated in FIG. 5. Inserting the pin member 80 through the other aperture 90 of the first flange member 85 and the aligned aperture 100 of the second flange member 95 positions the step platform assembly 35 exterior a vehicle body, as illustrated in FIG. 4. Again, the linear step support or member 45 is of sufficient length that the step platform member 40 extends beyond the horizontally positioned tailgate of a vehicle, thereby providing a step to assist in entering the cargo box of the vehicle, as illustrated in FIG. 6.

As described above, the step platform assembly 35 can be secured to an existing hitch assembly 12 to provide a step platform 40 that can be selectively stored and locked beneath a vehicle body when not needed, and quickly rotated and locked in a position to provide a step with the tailgate of a vehicle in a horizontal position. The trailer hitch assembly 12 remains available for use in the towing of other wheeled units. When a receiver hitch assembly 12 is installed on a vehicle, it is frequently desirable to have a combined step platform and hitch assembly 10 as a single unit that can be inserted and removed from the square tubular bracket member 14 secured to the vehicle frame or bumper. The user need only remove the pin that holds the square tubular support member 15 within the bracket member 14, remove one hitch assembly 12, and insert a combined step platform and hitch assembly 10 into the bracket member 14 and reinsert the pin to hold the assembly 10 in position. With a ball hitch assembly 60 as the fastener, the assembly 10 remains functional for towing other wheeled devices.

While the invention has been particularly shown and described with reference to a preferred embodiment thereof, it will be understood by those skilled in the art that various changes in form and details may be made therein without departing from the spirit and scope of the invention.

I claim:

1. A step platform assembly adapted for attachment to a hitch assembly comprising;
    (a) a planar step platform member rigidly fastened to a coplanar linear step support member having an aperture adjacent a step support member end opposite the step platform member, the aperture containing a bushing member therein, said planar step platform member and step support member assembly adapted for rotatable connection to the hitch assembly by a fastener means there between, the fastener means comprising a ball with threaded stem and nut fastener, the stem insertable in an aperture in the hitch assembly and in said step support member aperture containing a bushing member; and
    (b) locking means for selectively securing said step platform member and linear step support member in a first orientation beneath a vehicle body and in a second orientation exterior the vehicle body.

2. The step platform assembly according to claim 1 wherein the locking means comprises a second aperture in the hitch assembly and second and third apertures on opposites sides of the first aperture of the step support member, and a locking pin member, whereby inserting the pin member through the second aperture of the hitch assembly and the aligned second aperture of the step support member positions the step platform member beneath the vehicle body, and inserting the pin member through the second aperture of the hitch assembly and the aligned third aperture of the step support member positions the step platform member exterior the vehicle body.

3. The step platform assembly according to claim 1 wherein connecting the step platform assembly to a hitch assembly and positioning the step platform member exterior the vehicle body extends the step platform member beyond a horizontally oriented tailgate thereof.

4. A step platform and hitch assembly comprising;
    (a) a square tubular support member adapted for insertion into a receiver hitch bracket on a vehicle body;
    (b) a hitch connector member rigidly secured to one end of the tubular support member at an angle thereto, the hitch connector member having an end section opposite the tubular support member, the end section oriented parallel to the tubular support member, the end section having an aperture therein;
    (c) a planar step platform member rigidly fastened to a coplanar step support member having an aperture adjacent a step support member end opposite the step platform member, the aperture containing a bushing member therein;
    (d) fastener means insertable into said hitch connector member aperture and said step support member aperture, thereby rotatably connecting said step platform member and step support member to said hitch connector member and tubular support member; and
    (e) locking means for selectively securing said step platform member and step support member in a first orientation beneath the vehicle body and in a second orientation exterior the vehicle body.

5. The step platform and hitch assembly according to claim 4 wherein the fastener means includes a threaded bolt and nut connector.

6. The step assembly according to claim 4 wherein the fastener means includes a threaded ball hitch and nut connector.

7. The step platform and hitch assembly according to claim 4 wherein the locking means comprises first and second flange members, the first flange member secured to the hitch connector member of the hitch assembly and having two apertures therein, the second flange member secured to the step support member of the step platform assembly and having an aperture therein, and a locking pin member, whereby inserting the pin member through one aperture of the first flange member and the aligned aperture of the second flange member positions the step platform member beneath a vehicle body, and inserting the pin member through the other aperture of the first flange member and the aligned aperture of the second flange member positions the step platform member exterior a vehicle body.

8. The step platform assembly according to claim 4 wherein the locking means comprises a second aperture in the hitch connector member of the hitch assembly and second and third apertures on opposites sides of the first aperture of the step support member, and a locking pin member, whereby inserting the pin member through the second aperture of the hitch connector member of the hitch assembly and the aligned second aperture of the step support member positions the step platform beneath the vehicle body, and inserting the pin member through the second aperture of the hitch connector member of the hitch assembly and the aligned third aperture of the step support member positions the step platform member exterior the vehicle body.

9. The step platform assembly according to claim 4 wherein positioning the step platform member exterior the vehicle body extends the step platform member beyond a horizontally oriented tailgate thereof.

10. A step platform and hitch assembly comprising;
   (a) a square tubular support member adapted for insertion into a receiver hitch bracket on a vehicle body;
   (b) a hitch connector member rigidly secured to one end of the tubular support member at an angle thereto, the hitch connector member having an end section opposite the tubular support member, the end section oriented parallel to the tubular support member, the end section having an aperture therein;
   (c) a planar step platform member rigidly fastened to a coplanar step support member having an aperture adjacent a step support member end opposite the step platform member, the aperture containing a bushing member therein;
   (d) a threaded ball hitch and nut connector assembly insertable into said hitch connector member aperture and said step support member aperture, thereby rotatably connecting said step platform member and step support member to said connector member and tubular support member; and
   (e) locking means for selectively securing said step platform member and step support connector member in a first orientation beneath the vehicle body and in a second orientation exterior the vehicle body.

11. The step platform assembly according to claim 10 wherein the locking means comprises a second aperture in the hitch connector member of the hitch assembly and second and third apertures on opposites sides of the first aperture of the step support member, and a locking pin member, whereby inserting the pin member through the second aperture of the hitch connector member of the hitch assembly and the aligned second aperture of the step support member positions the step platform beneath the vehicle body, and inserting the pin member through the second aperture of the hitch connector member of the hitch assembly and the aligned third aperture of the step support member positions the step platform member exterior the vehicle body.

12. The step platform assembly according to claim 10 wherein positioning the step platform member exterior a vehicle body extends the step platform member beyond a horizontally oriented tailgate thereof.

* * * * *